United States Patent [19]
Arguin

[11] Patent Number: 4,526,395
[45] Date of Patent: * Jul. 2, 1985

[54] TANDEM TRAILER SYSTEM

[76] Inventor: Gerard Arguin, 3 Valley St., Spencer, Mass. 01562

[ * ] Notice: The portion of the term of this patent subsequent to Aug. 23, 2000 has been disclaimed.

[21] Appl. No.: 520,993

[22] Filed: Aug. 8, 1983

Related U.S. Application Data

[62] Division of Ser. No. 294,775, Aug. 20, 1981, Pat. No. 4,400,004.

[51] Int. Cl.³ .............................................. B62D 53/08
[52] U.S. Cl. ................................ 280/408; 280/405 A; 280/420
[58] Field of Search ................... 280/405 A, 408, 420, 280/421, 422

[56] References Cited

U.S. PATENT DOCUMENTS

| | | | |
|---|---|---|---|
| 2,733,033 | 1/1956 | Gunderson | 280/421 |
| 3,066,953 | 12/1962 | Chosy | 280/418 |
| 3,421,777 | 1/1969 | Barker et al. | 280/408 |
| 4,111,450 | 9/1978 | Pinto | 280/408 |
| 4,400,004 | 8/1983 | Arauin | 280/408 |

FOREIGN PATENT DOCUMENTS 1098929  4/1981  Canada ................. 280/408

Primary Examiner—Joseph F. Peters, Jr.
Assistant Examiner—Kenneth R. Rice
Attorney, Agent, or Firm—Blodgett & Blodgett

[57] ABSTRACT

An intermediate trailer for use between a standard tractor and a standard trailer, the intermediate trailer having a chassis mounted at its rear end, consisting of a first portion which is fixed to the trailer and a second portion which is slidable relative to the first portion from a first position under the trailer to a second position extending rearwardly of the trailer, the second portion having wheels mounted thereon.

5 Claims, 16 Drawing Figures

TANDEM TRAILER SYSTEM

This is a division of application Ser. No. 294,775 filed Aug. 20, 1981 now U.S. Pat. No. 4,400,004.

BACKGROUND OF THE INVENTION

In the transportation industry, the use of tandem trailer rigs has become very important, mainly because of its cost-effectiveness. This is because such an arrangement uses only one driver and one tractor at a time, while the load carrying capacity is twice as great. The main difficulty experienced in the past with the using two trailers in tandem is the method by which they are joined together. If, for instance, one uses a standard bogie, there are two articulations, one of which is under the rear end of the front trailer and one of which is under the front end of the rear trailer. Such a double articulation is dangerous, because it permits several kinds of buckling and similar motions between the two trailers, thus leading to accidents. In my U.S. Pat. Nos. 3,933,374 and 4,030,171, I suggested that a solution to this dangerous problem could be brought about by use of an extension protruding beyond the rear of the front trailer. While this arrangement is generally satisfactory, it has the drawback that the intermediate trailer is almost entirely committed to use in tandem rigs and has very little use for running single. Furthermore, it is difficult to back up to a loading dock even when it is provided with the hinged platform shown in the patent. These and other difficulties experienced with the prior art devices have been obviated in a novel manner by the present invention.

It is, therefore, an outstanding object of the invention to provide a tandem trailer system in which the connection between the trailers provides a single point of pivot or articulation.

Another object of this invention is the provision of a tandem trailer system in which the connection between the trailers remains permanently with one of the trailers and, therefore, is not subject to pilferage or vandalism, as is true when a bogie is left by itself.

It is another object of the instant invention to provide a tandem trailer system in a special forward trailer, which special trailer can be used by itself.

A still further object of the invention is the provision of a tandem trailer system in which the connection between the trailers remains permanently with the front trailer, which front trailer, nevertheless, can be moved close to a loading dock.

It is a further object of the invention to provide a tandem trailer system which is simple in construction, which is inexpensive to manufacture, and which is capable of a long life of useful service with a minimum of maintenance.

With these and other objects in view, as will be apparent to those skilled in the art, the invention resides in the combination of parts set forth in the specification and covered by claims appended hereto.

SUMMARY OF THE INVENTION

In general, the invention consists of a trailer unit adapted to be drawn behind a highway tractor and behind which unit can be drawn a second standard trailer. The unit consists of a cargo container and a chassis on which the container is mounted. The chassis has a first upper portion and a second lower portion, the second portion being longitudinally slidable relative to the first portion from a first position generally co-extensive with the first portion to a second position where it extends beyond the end of the cargo container. A first attaching means is associated with the front end of the container for connection to the highway tractor and a second attaching means is associated with the second portion of the chassis, so that, when the second portion is in second position, another trailer can be attached to it. Wheels are mounted on the said second portion of the chassis.

More specifically, a pair of locking pins are mounted on the second portion for transverse movement to engage apertures in the first portion when the second portion is in the first or second position; the pins, therefore, serve to hold the first and second portions against relative sliding movement in the first and second position. The wheels are provided with pneumatic brakes and the locking pins are provided with a pneumatic actuator cylinder. A selector valve is provided to connect a source of pressure air selectively to the brakes or the cylinder, so that the locking pins are released when the brakes are locked and the pins are engaged when the brakes are free. The lower portion is provided with three pairs of wheels, the wheels being mounted so that one pair is at the front end of the lower portion, one pair is at the rear end, and one pair is in the middle; the second attaching means is a fifth wheel located over rear pair of wheels.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
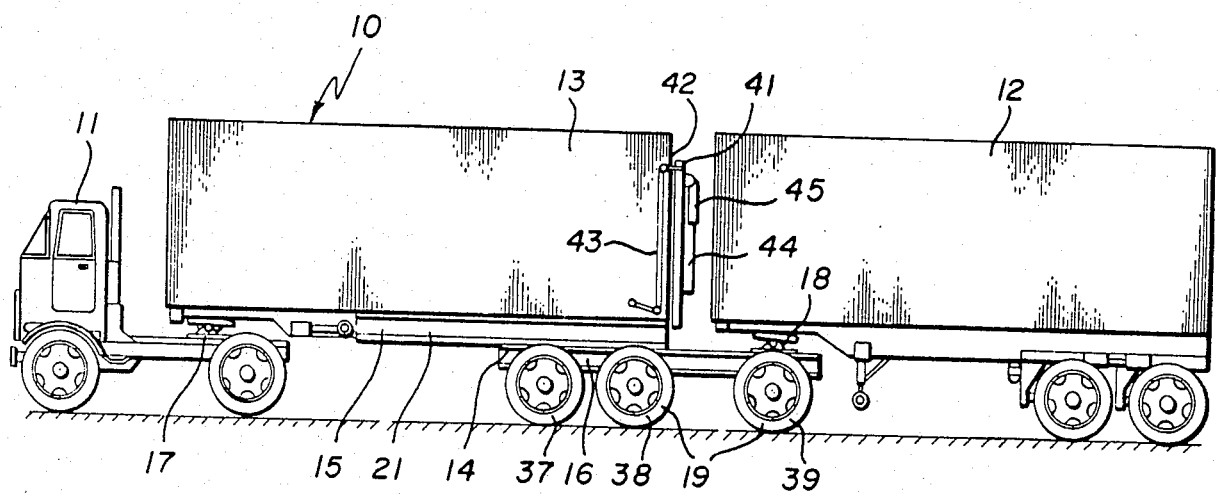
FIG. 1 is a side elevational view of a trailer unit embodying the principles of the present invention showing two trailers operating in tandem.

Referring first to FIG. 1, which best shows the general features of the invention, the trailer unit, indicated generally by the reference numeral 10, is shown as being drawn behind a highway tractor 11. The trailer unit in turn, is drawing a second trailer unit 12 behind itself. The trailer unit 10 consists of a cargo container 13, at the rear end of which is carried a chassis 14. The chassis has a first upper portion 15 and a second lower portion 16. The second portion 16 is longitudinally slidable relative to the first portion 15 from a first position in which it is generally co-extensive with the first portion to a second portion in which it extends beyond the end of the cargo container 13, as shown in FIG. 1. A first attaching means 17 extends downwardly from the forward portion of the container 13 for connection to the fifth wheel of the tractor 11. A second attaching means 18 in the form of a fifth wheel is associated with the second portion 16 of the chassis, so that, when the second portion is in the second position, another trailer 12 can be attached to it. A set 19 of wheels is mounted on the said second portion of the chassis.

Figure 2:
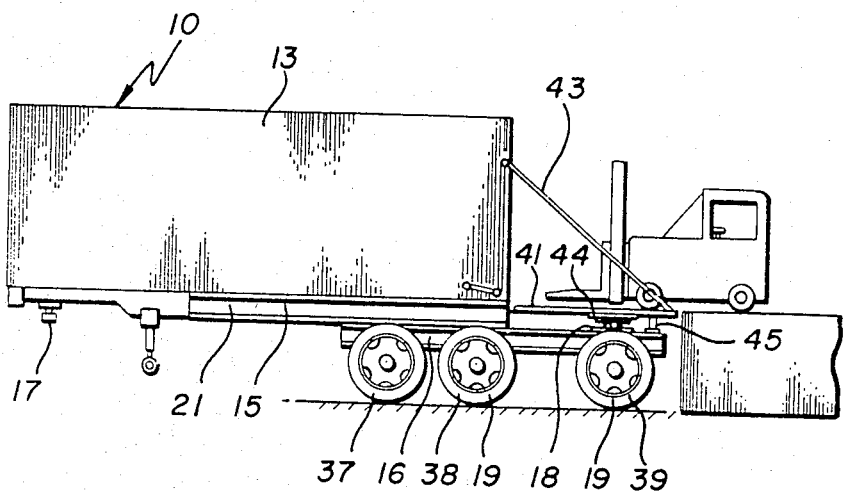
FIG. 2 is side elevational view of a front trailer at a loading dock.

FIG. 2 shows the manner in which the container 13 can be unloaded. The second portion 16 remains in the second position, but a platform is provided to allow a lift truck or similar unloading apparatus to be carried into the container.

Figure 3:
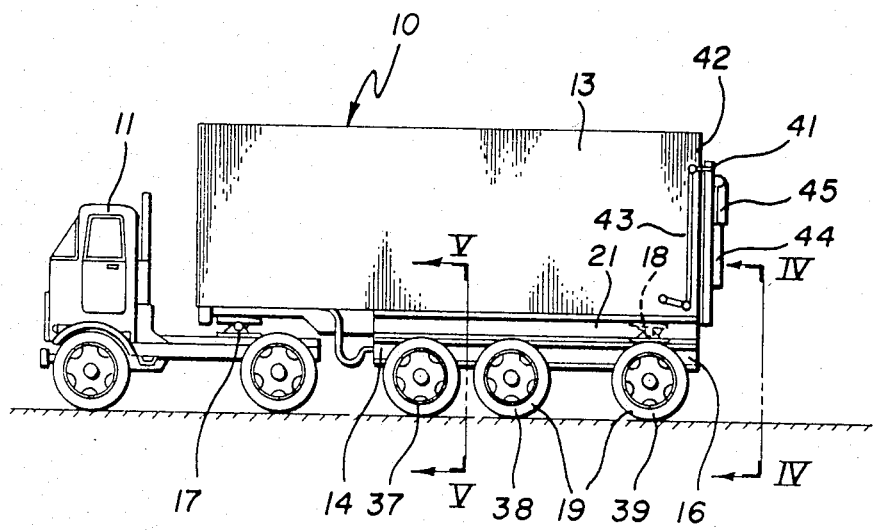
FIG. 3 is a side elevational view of the trailer unit using only one trailer.

FIG. 3 shows the manner in which the container 13 can be moved over the road by itself behind the tractor 11. The second portion 16 is in the first position, that is to say, is co-extensive with the first portion of the chassis. At that time the attaching means 18 lies under the container and the wheels 19 are entirely beneath the container.

Figure 4:
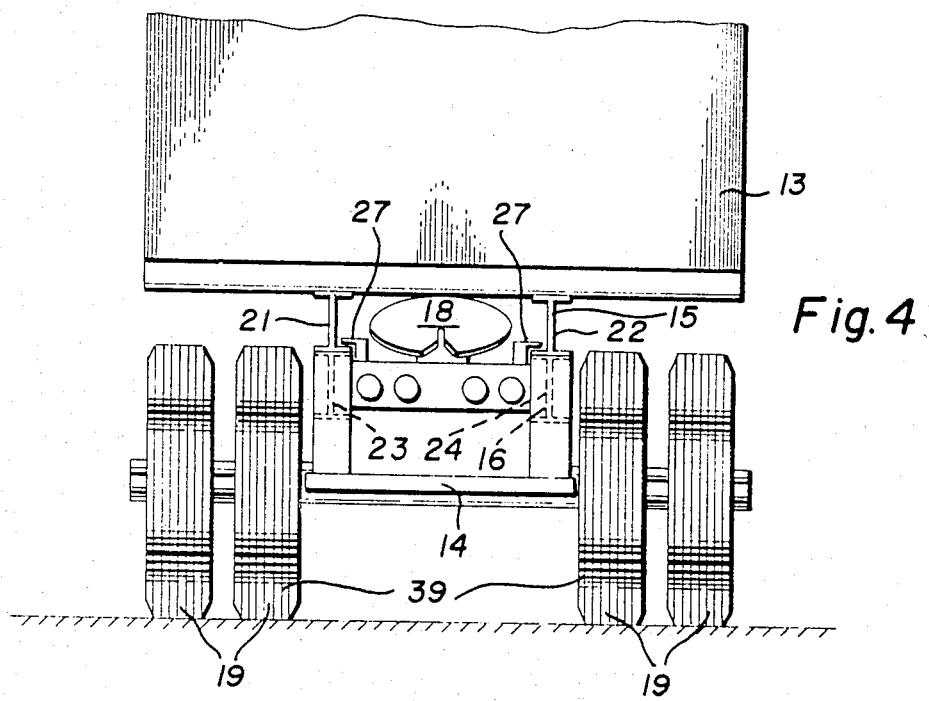
FIG. 4 is a rear elevational view of the trailer unit taken on the line IV—IV of FIG. 3.
Figure 5:
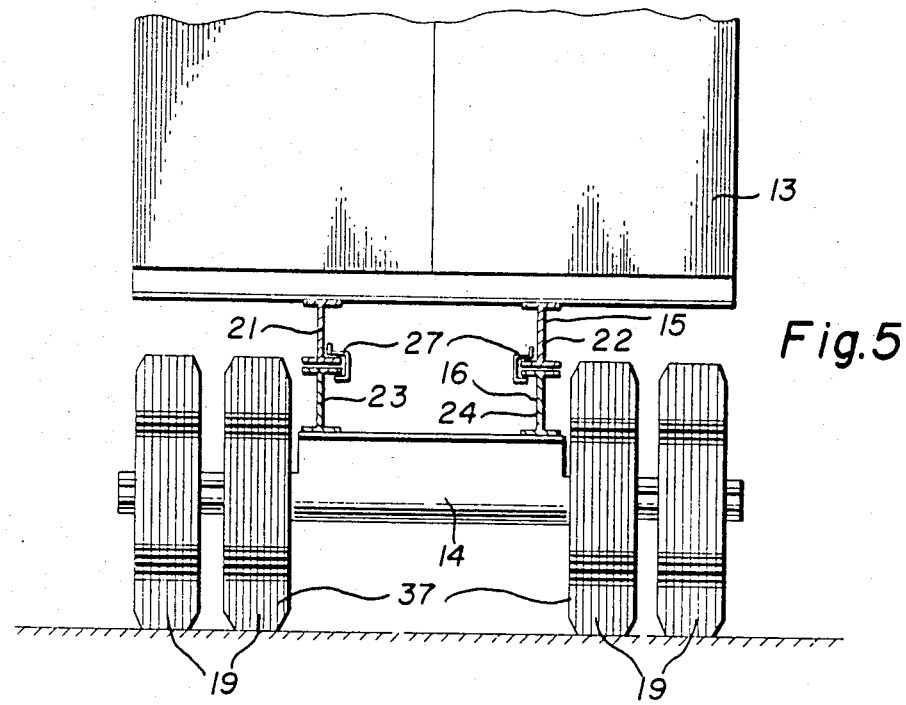
FIG. 5 is a transverse vertical sectional view of the trailer unit taken on the line V—V of FIG. 3.
Figure 6:
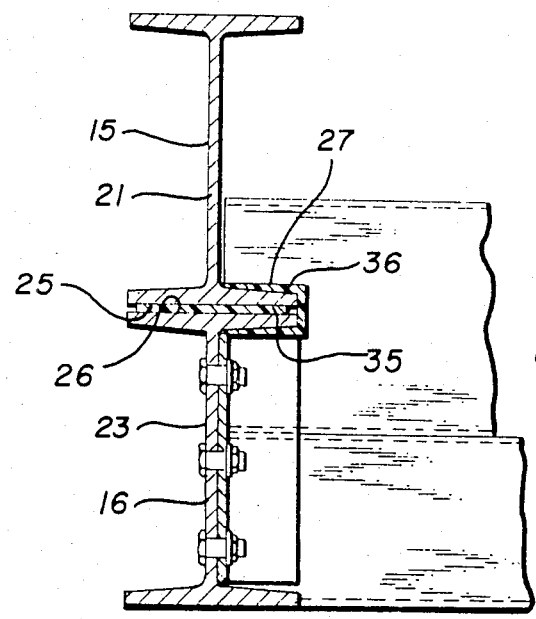
FIG. 6 is an enlarged sectional view of a portion of the apparatus.

Referring next to FIGS. 4, 5, and 6, which shows the details of the first portion 15 and the second portion 16, it can be seen that the first portion 15 is provided with two spaced, parallel I-beams 21 and 22. The second portion 16 consists of two similar I-beams 23 and 24 held in spaced, parallel relationship. As shown in FIG. 6, the undersurface 25 of the I-beam 21 rests on the upper surface 26 of the I-beam 16, while a similar relationship takes place between the I-beams 22 and 24. Guides 27 are attached to the I-beams 23 and 24 and form part of the second portion 16; these guides envelope the bottom inner flanges of the upper I-beams 21 and 22.

Figure 7:
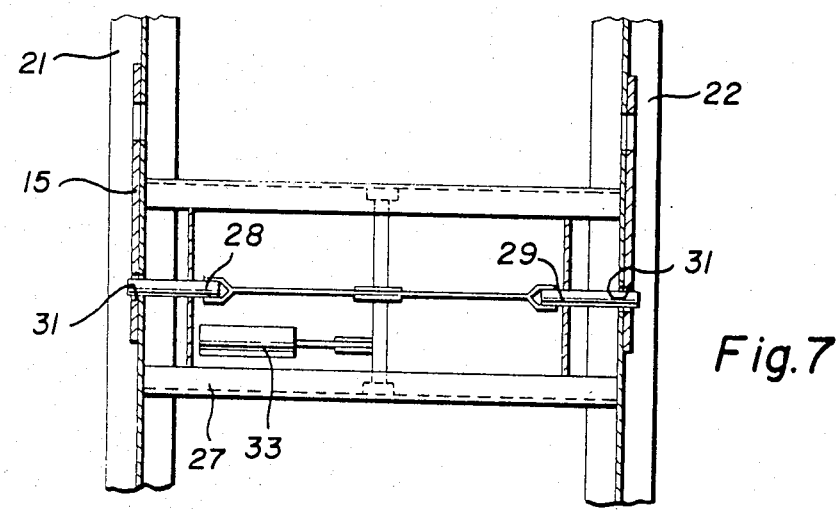
FIG. 7 is a horizontal sectional view of the apparatus.
Figure 8:
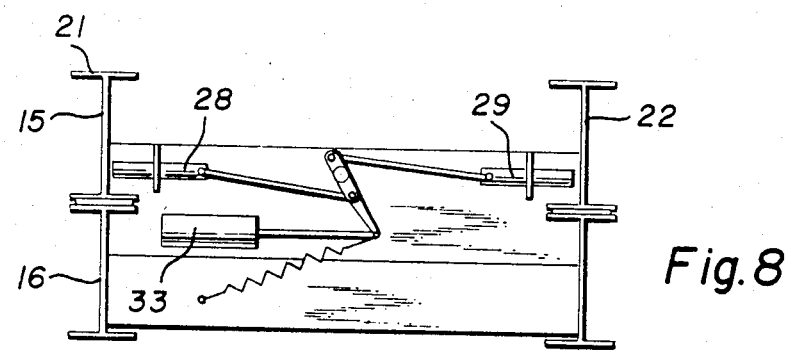
FIGS. 8 and 9 are schematic cross-sectional views of the invention, showing locking means in two different conditions.
Figure 9:
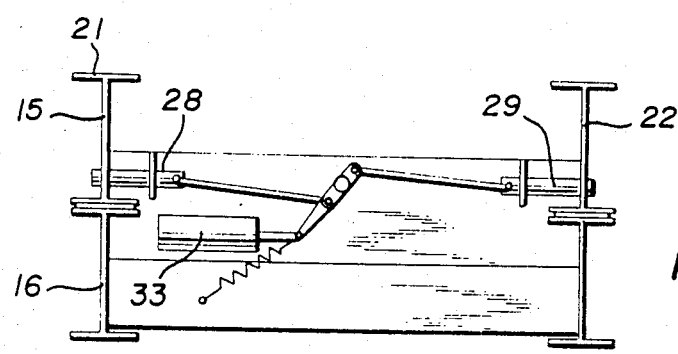

As shown in FIGS. 7, 8, and 9, a pair of stops such as locking pins 28 and 29 are mounted on the second portion 16 for transverse movement to engage apertures 31 of the first portion 15 when the second portion 16 is in the first or second position. These pins serve to hold the first and second portions against relative sliding movement when in the said first or second positions.

Figure 10:
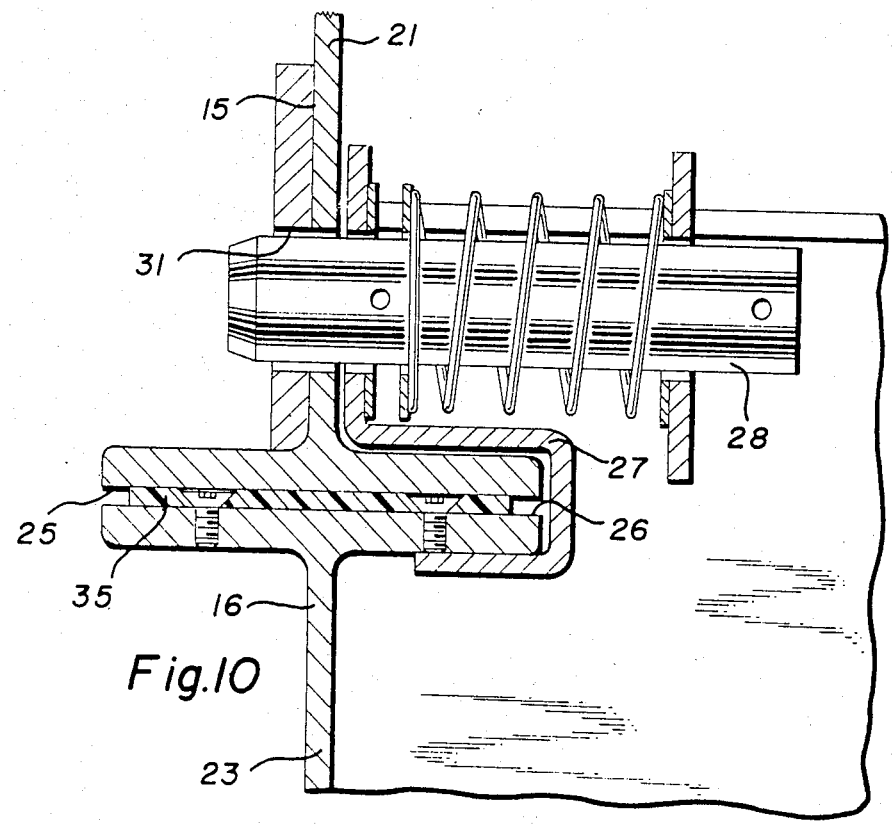
FIG. 10 is an enlarged transverse sectional view of a portion of the apparatus showing a locking pin in use.

FIG. 10 shows the details of the locking pin 28 and the manner in which it engages an aperture 31.

Figure 11:
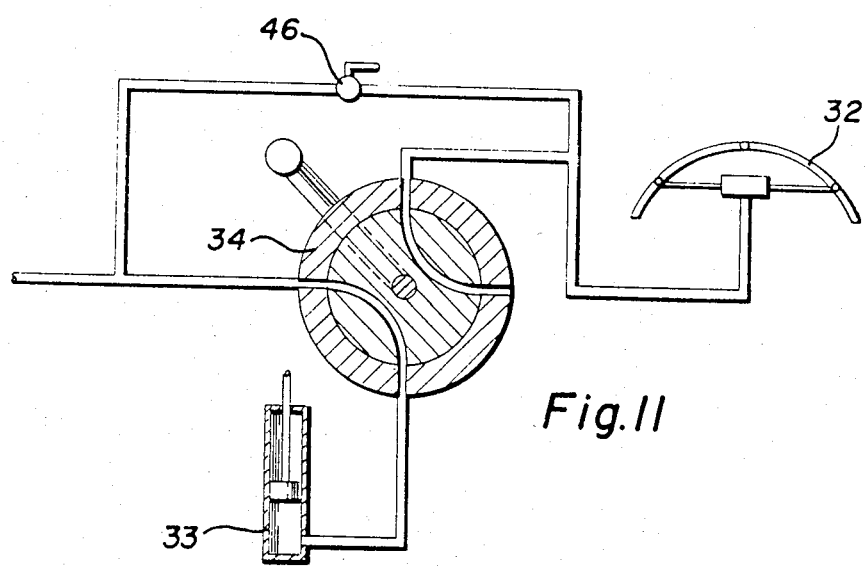
FIG. 11 is a schematic circuit view of pneumatic apparatus used in the trailer unit.

Referring to FIG. 11, it can be seen that the wheels 19 are provided with pneumatic brakes 32, while the locking pins 28 and 29 are provided with a pneumatic actuator cylinder 33. A selector valve 34 is provided to connect a source of pressure air selectively to the brakes 32 or the cylinder 33 so that the locking pins are released when the brakes are locked and the pins are engaged when the brakes are free. The brakes are provided with the conventional system, including a valve 46, for use when running over the road.

FIG. 6 shows the provision of slide pads, formed preferably of Teflon, attached to the upper surface 26 of the I-beams 23 and 24 to facilitate sliding motion between the first and second portions. The guides 27 are also provided with side pads 36 to facilitate relative sliding of the I-beams 26 and 22.

As is particularly evident in FIG. 1, the lower portion 16 is provided with three pairs of wheels 37, 38 and 39, these making up the set 19 of wheels. The wheels are mounted so that the one pair 37 is located at the front of the lower portion 16, one pair 39 is at the rear end, and one pair 38 lies between them substantially closer to the set 37. A second attaching means 18 in the form of a fifth wheel is located between the middle and rear pair of wheels 38 and 39, respectively.

As is particularly evident in FIG. 2, a platform 41 is provided between the cargo container 13 and the rear end of the chassis 14. The platform can be moved so that it extends only a short distance beyond the rear end of the container. The platform is hingedly connected to the chassis near the rear end of the cargo container and normally lies against the container door 42. A cable 43 is connected to the platform to control its movement. Legs are provided to support the platform against movement even if considerable weight is placed on it.

Figure 12:
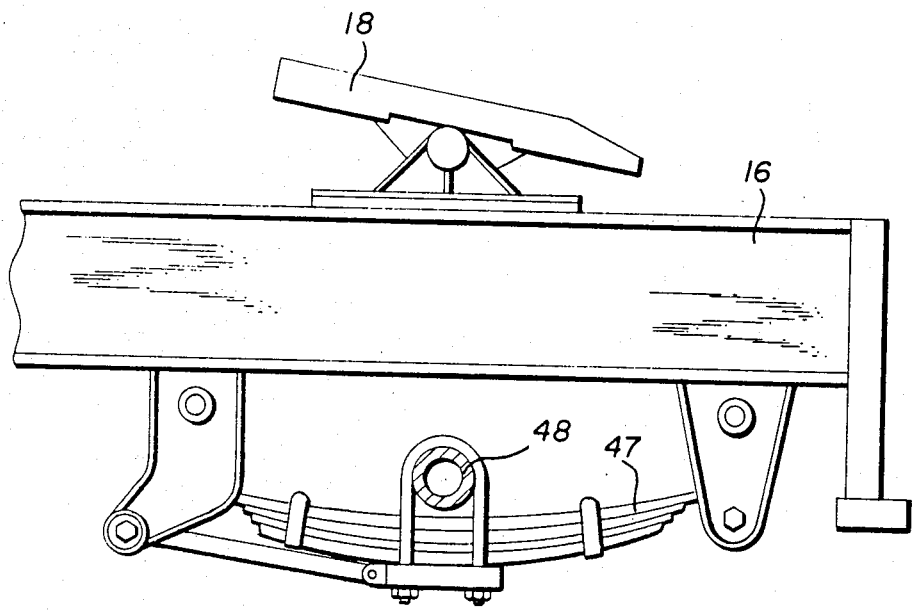
FIG. 12 is a side elevational view of a portion of the trailer unit.

FIG. 12 shows the manner in which a leaf spring 47 is mounted on the second portion 16 of the chassis. It overlies and supports the axle 48 of the wheel set 39 in such a way that the axle underlies the pivotal axis of the second attaching means 18.

Figure 13:
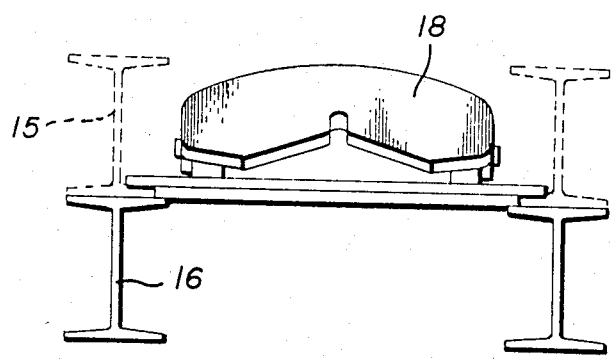
FIG. 13 is a transverse vertical sectional view of a portion of the trailer unit.

FIG. 13 shows the manner in which the second attaching means 18 is located within the space defined by the first portion 15 of the chassis. This feature permits it to reside under the container 13 when the second portion is nested under the container, as shown in FIG. 3.

Figure 14:
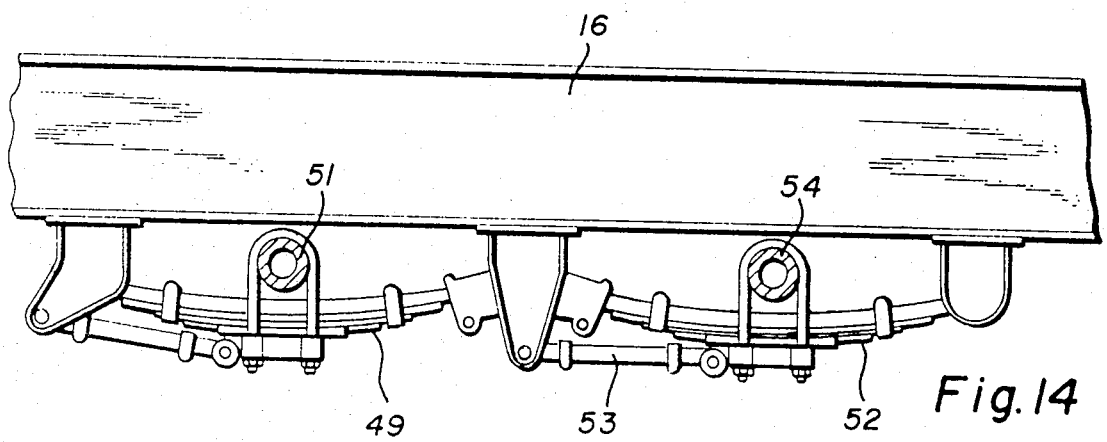
FIG. 14 is a side elevational view of a portion of the trailer unit.

FIG. 14 shows the manner in which the second portion 16 of the chassis is provided with a leaf spring 49 to support the axle 51 of the front wheels 37. A leaf spring 52 with a stabilizer 53 is used to support the axle 54 associated with the intermediate wheels 38.

Figure 15:
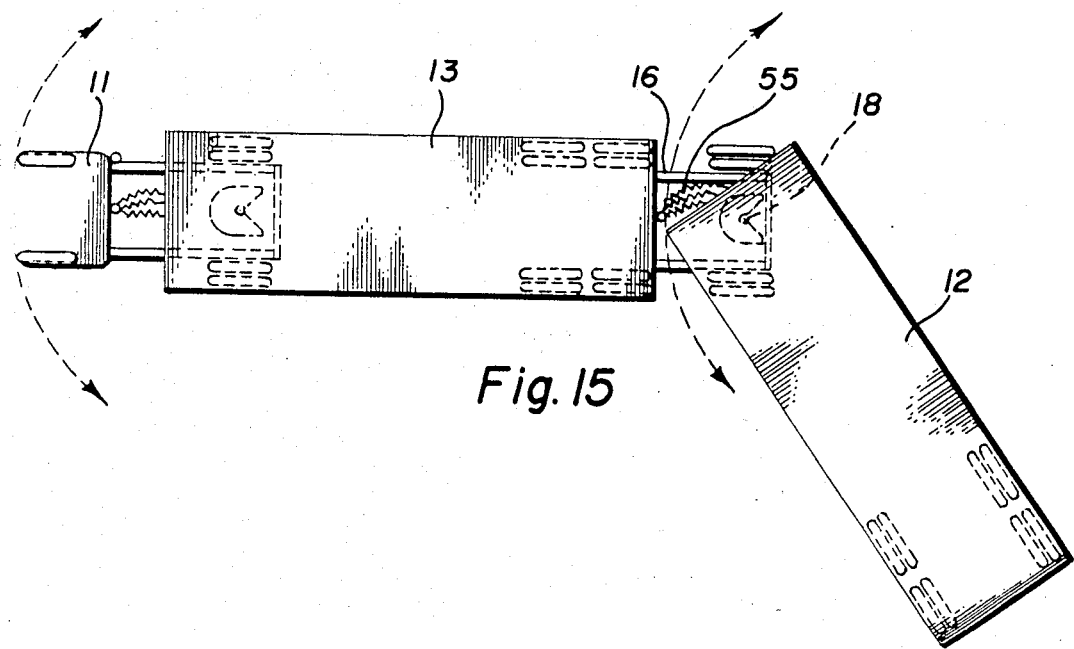
FIG. 15 is a plan view of the trailer unit during turning.
Figure 16:
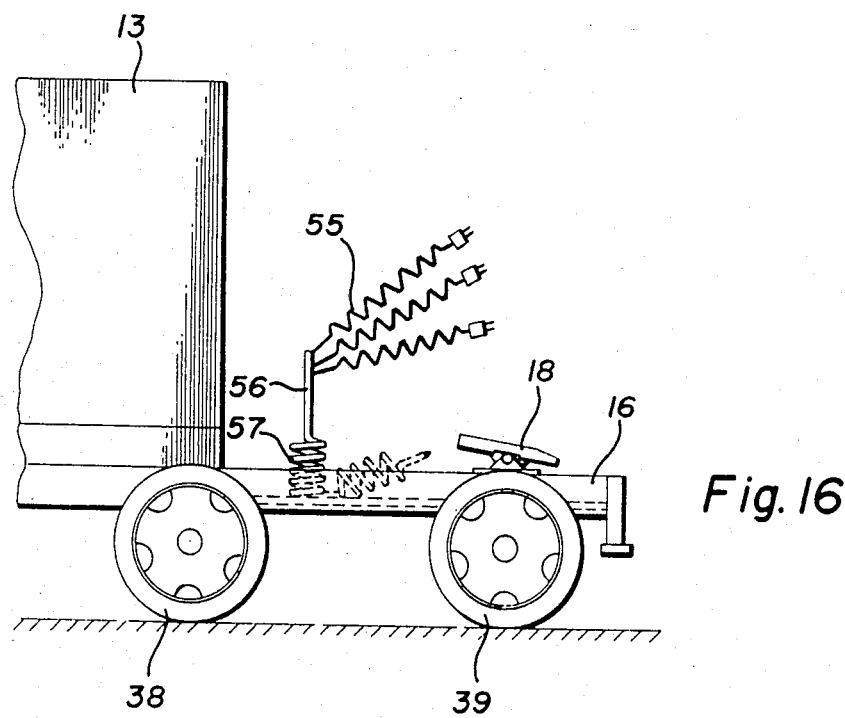
FIG. 16 is a side elevational view of the trailer unit.

In FIGS. 15 and 16 are shown the cables 55 carried by the second portion 16 to supply electrical current and pressure air to the rear trailer 12. These cables are carried on a rod 56 which is connected to the second portion 16 through a flexible spring 57. The dimensions of the cables 55, rod 56, and spring 57 are selected to permit them to lie between the I-beams 23 and 24 of the second portion 16 when it is in the first position under the first portion 15, as indicated in broken lines. FIG. 15 shows the manner in which the location of the second attaching means 18 is selected to allow the forward corners of the rear trailer 12 to avoid contact during turning with the rear of the front railer 13.

The operation and advantages of the present invention will now be readily understood in view of the above description. In FIG. 1, which shows two trailers 12 and 13 in tandem, it can be seen that the only connection between them is at the attaching means 18, which means that a single pivot joins the trailers and the dangers of articulation about two pivots is not present. There is no bogie that would be left behind when the rear trailer is dropped off at its destination or when a portion of the highway is reached in which tandem operation is forbidden. Normally, the unloading of the container 13 would take place in the manner shown in FIG. 2 with the platform 41 in horizontal position, having been lowered to that position by means of a cable 43. A plate 44 rests on the fifth wheel 18 and legs 45 are provided to give additional support for the platform. This allows a forklift truck to enter the container from the dock.

At the same time when the rear trailer has been dropped off it is possible to use the trailer 13 and the tractor 11 by themselves. At that time, the apparatus takes the condition shown in FIG. 3.

In order to move the lower portion 16 from one position to another, it is possible to use the braking system shown in FIG. 11. If the valve 34 is operated to move the actuating cylinder 33, the locking pins 28 and 29 are in locked position and the brakes 32 are free, so that the apparatus can roll on the wheels 37, 38 and 39 without difficulty. When it is necessary to move the lower portion 16 from one position to the other, this is done also by means of the valve 34. If, for instance, the portion 16 is shown in the condition shown in FIG. 1 and it is desired to move it to the first position shown in FIG. 3, it is only necessary to move the valve 34 to a second position in which the brakes 32 receive pressure air, thus locking them against rolling. At that time the cylinder 33 is released, thus allowing the springs in the system to pull the locking pins 28 and 29 out of their position 31. When this is done, the tractor and the container 13 are moved backwardly. Since the wheels brakes 32 in the wheels 19 are locked in place this causes the first portion 15 of the chassis 14 to slide rearwardly over the second portion 16. Eventually, a limiting position is reached, as shown in FIG. 3, and the valve 34 is changed back to the position shown in FIG. 11 where the actuating cylinder 33 causes the locking pin to move into place and lock them in the first or front condition, the wheels are, therefore, free. Tractor 11 and the container 13 are then free to move over the road as a single unit. The normal brake system is operative on the brakes 32 at that time.

As shown in FIGS. 12 and 14, the axles 48, 51 and 54 are mounted above their respective springs by use of shackles. This allows the use of standard size wheels, even though the second attaching means 18 is located at a low enough level to permit the rear trailer 12 to be a standard trailer unit.

FIG. 15 indicates the manner in which the entire unit, including the tractor 11, the front trailer 13, and the rear trailer 12, can turn on a very small radius. More specifically, the front corners of the rear trailer 12 clear the rear end of the front trailer 13 by substantial amounts during turning.

FIG. 16 shows clearly the way in which the cables 55 on their support rod 56 and spring 57 are pressed downwardly into a storage position when the second portion 16 slides from its rear, second position to its front, first position. When the reverse movement takes place, the cables spring upwardly into the functional position for connection to the coupling element on the front end of the rear trailer 12. An alarm is provided that is energized when the pins are released and remains operative when moving the sliding elements from one position to the other.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Trailer system to be drawn behind a highway tractor and behind which can be drawn a second trailer unit, comprising:

(a) a cargo container,
(b) a chassis on which the container is mounted, the chassis having a first upper portion and a second lower portion, the second portion being longitudinally slidable relative to the first portion from a first position generally co-extensive with the first portion to a second position where it extends beyond the end of the cargo container, the first portion of the chassis consisting of a pair of I-beams held in spaced, parallel relationship for attachment to the container, the second portion of the chassis consisting of a similar pair of I-beams connected together in spaced, parallel relationship and underlying the first portion, so that the undersurface of the lower flange of each I-beam of the first portion is supported on upper surface of the upper flange of the corresponding I-beam of the second portion, a plurality of guides being fixed to the I-beams of the second portion and embracing the lower flanges of the I-beams of the first portion,
(c) a pair of locking pins mounted on the second portion for transverse movement to engage apertures in the first portion when the second portion is in the first or second position to hold the first and second portions against relative sliding movement when in the first or second position,
(d) first attaching means associated with the front end of the container for connection to the highway tractor,
(e) a second attaching means associated with the second portion of the chassis, so that, when the second portion is in the second position, another trailer can be attached to it,
(f) wheels mounted on the said second portion of the chassis, the wheels being provided with pneumatic brakes, the locking pins being provided with a pneumatic actuator cylinder, and a selector valve being provided to connect a source of pressure air selectively to the brakes or the cylinder, so that the locking pins are released when the brakes are locked and the pins are engaged when the brakes are free, and
(g) electrical and pneumatic cables extending through the upper portion and attached to a wand extending upwardly from the lower portion, the lower end of the wand being attached to the lower portion through a spring, so that the cables and wand can be bent downwardly when the lower portion is moved from the second position to the first position.

2. Trailer system as recited in claim 1, wherein slide pads are provided between facing surfaces of flanges on the upper and lower portions.

3. Trailer system as recited in claim 1, wherein the lower portion is provided with three sets of wheels, the wheels being mounted so that one pair is at the front end of the lower portion, one pair is at the rear end, and one pair is located between the other two sets of wheels, and wherein the second attaching means is a fifth wheel located above the set of wheels located at the rear end of the lower portion.

4. Trailer system as recited in claim 1, wherein the first attaching means is a king pin suitable for connection to a fifth wheel and the second attaching means is a fifth wheel.

5. Trailer system as recited in claim 1, wherein the second attaching means is located on the lower portion far enough rearwardly that the front end of the second trailer unit can swing relative to the cargo container during turning without striking the rear end of the cargo container.

* * * * *